United States Patent
Bansal et al.

(10) Patent No.: US 12,399,689 B2
(45) Date of Patent: Aug. 26, 2025

(54) CONFIGURATION FILE EDITOR WITH INTELLIGENT CODE-BASED INTERFACE AND VISUAL INTERFACE

(71) Applicant: Harness Inc., San Francisco, CA (US)

(72) Inventors: Vardan Bansal, Noida (IN); Abhinav Singh, Gwalior (IN); Rama Tummala, Phoenix, AZ (US)

(73) Assignee: Harness Inc., San Francisco, CA (US)

( * ) Notice: Subject to any disclaimer, the term of this patent is extended or adjusted under 35 U.S.C. 154(b) by 127 days.

(21) Appl. No.: 17/833,609

(22) Filed: Jun. 6, 2022

(65) Prior Publication Data

US 2023/0393818 A1 Dec. 7, 2023

(51) Int. Cl.
G06F 9/445 (2018.01)
G06F 8/33 (2018.01)
G06F 8/34 (2018.01)

(52) U.S. Cl.
CPC . *G06F 8/33* (2013.01); *G06F 8/34* (2013.01)

(58) Field of Classification Search
CPC ..................... G06F 8/33; G06F 8/34
USPC .................................. 717/105–109
See application file for complete search history.

(56) References Cited

U.S. PATENT DOCUMENTS

| | | | | |
|---|---|---|---|---|
| 10,521,195 | B1* | 12/2019 | Swope | G06F 9/54 |
| 11,100,059 | B2* | 8/2021 | Desmarets | G06F 16/212 |
| 2019/0042603 | A1* | 2/2019 | Park | G06F 9/541 |

* cited by examiner

*Primary Examiner* — Chuck O Kendall

(57) ABSTRACT

An intelligent editor for creating a pipeline configuration file. The pipeline configuration file can be a YAML configuration file or in some other data serialization language. The intelligent editor is in the form of a YAML editor that provides multiple user interfaces for editing a pipeline configuration file. The YAML editor includes a code-based editing UI to edit the YAML configuration file code itself, and a visual-based editor UI for creating and modifying the configuration file through using graphical icons. The code-based editor UI includes an intelligent field and value recommendation feature, auto-complete feature, a semantic error detection feature, and a field documentation feature. The configuration file created and modified in the YAML editor can be based on a schema generated from one or more microservice schemas.

20 Claims, 17 Drawing Sheets

CONFIGURATION FILE EDITOR WITH INTELLIGENT CODE-BASED INTERFACE AND VISUAL INTERFACE

BACKGROUND

Continuous integration of software involves integrating working copies of software into mainline software, in some cases several times a day. Creating a pipeline dedicated to integrating working copies of new software into fully executing mainline software often requires creating a configuration file. Creating a configuration file can be very tedious. Even with several sources of accessible to the programmer, configuration file creation is slow, error prone, and inefficient. What is needed is an improved method for creating a configuration file.

SUMMARY

The present technology, roughly described, provides an intelligent editor for creating a pipeline configuration file. The pipeline configuration file can be a YAML configuration file or in some other data serialization language. The intelligent editor is in the form of a YAML editor that provides multiple user interfaces for editing a pipeline configuration file. The YAML editor includes a code-based editing UI to edit the YAML configuration file code itself, and a visual-based editor UI for creating and modifying the configuration file through using graphical icons. The code-based editor UI includes an intelligent field and value recommendation feature, auto-complete feature, a semantic error detection feature, and a field documentation feature. The configuration file created and modified in the YAML editor can be based on a schema generated from one or more microservice schemas.

In some instances, the present technology provides a method for modifying a pipeline configuration file. The method begins by receiving, by a YAML editor module executing on a first server, a plurality of schemas from a plurality microservices, wherein at least one of the plurality of schemas having a first format. Multiple schemas derived from the received schemas are then merged or converted into a single stitched schema. Input is received from a user through a YAML user interface. The received input is used to modify a YAML file, wherein the YAML user interface to edit the YAML file through a YAML code editor or a visual interface based on graphical icons. The method continues with retrieving, by the YAML editor module, custom field values associated with the received input, wherein the custom field values retrieved at least in part from the single stitched schema. The custom field values are then provided in the UI to the user and one of the custom field values is inserted into the YAML file within the UI based on a user selection of the custom field values.

In some instances, a non-transitory computer readable storage medium includes embodied thereon a program, the program being executable by a processor to perform a method for modifying a pipeline configuration file. The method begins by receiving, by a YAML editor module executing on a first server, a plurality of schemas from a plurality microservices, wherein at least one of the plurality of schemas having a first format. Multiple schemas derived from the received schemas are then merged or converted into a single stitched schema. Input is received from a user through a YAML user interface. The received input is used to modify a YAML file, wherein the YAML user interface to edit the YAML file through a YAML code editor or a visual interface based on graphical icons. The method continues with retrieving, by the YAML editor module, custom field values associated with the received input, wherein the custom field values retrieved at least in part from the single stitched schema. The custom field values are then provided in the UI to the user and one of the custom field values is inserted into the YAML file within the UI based on a user selection of the custom field values.

In some instances, a system for modifying a pipeline configuration file includes a server having a memory and a processor. One or more modules can be stored in the memory and executed by the processor to receive, by a YAML editor module executing on a first server, a plurality of schemas from a plurality microservices, at least one of the plurality of schemas having a first format, merge multiple schemas derived from the received schemas into a single stitched schema, receive input, from a user through a YAML user interface, to modify a YAML file, the YAML user interface to edit the YAML file through a YAML code editor or a visual interface based on graphical icons, retrieve, by the YAML editor module, custom field values associated with the received input, the custom field values retrieved at least in part from the single stitched schema, provide the custom field values in the UI to the user, insert one of the custom field values into the YAML file within the UI based on a user selection of the custom field values.

DETAILED DESCRIPTION

Figure 1:
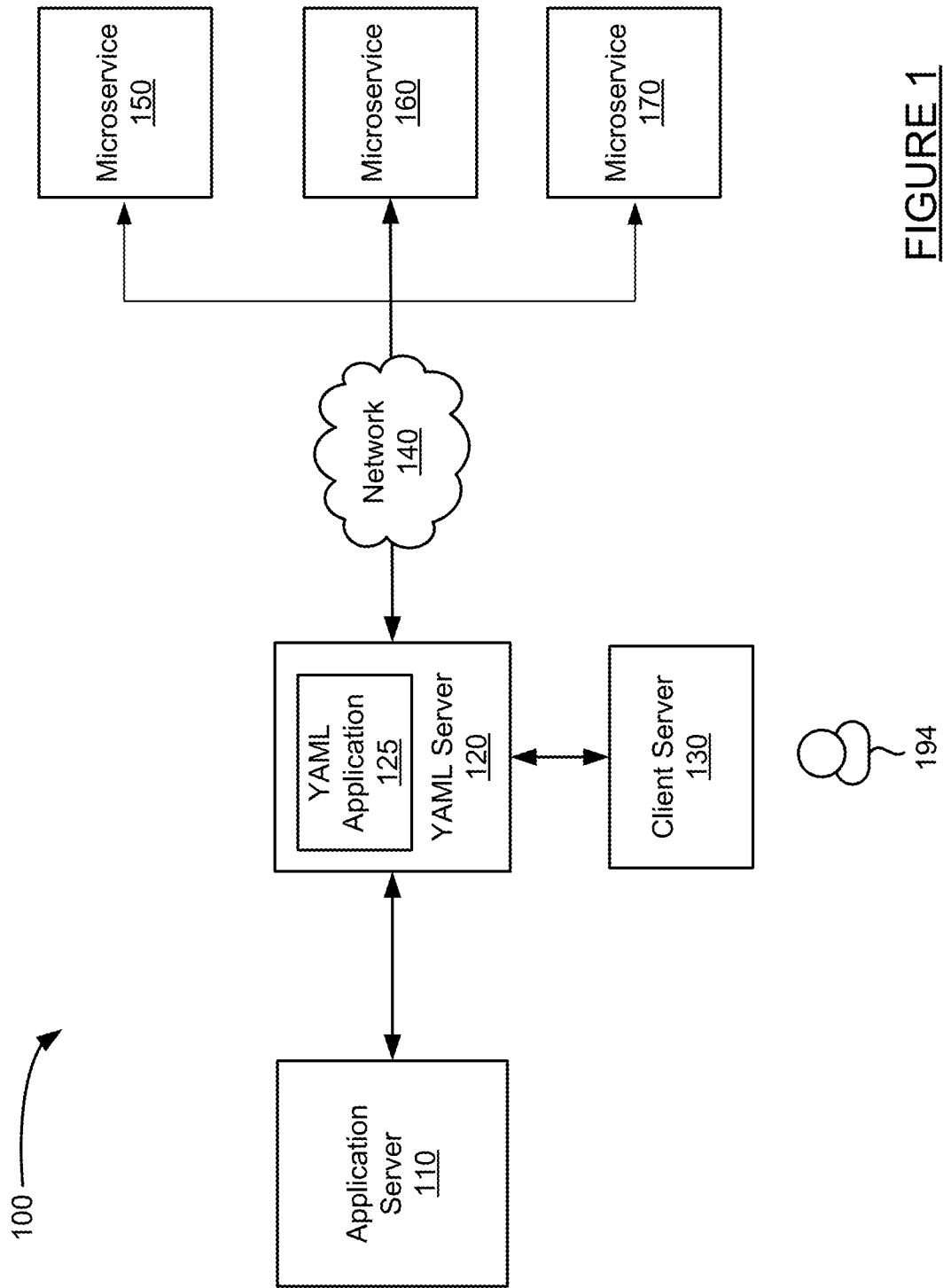
FIG. 1 is a block diagram of a system for providing a YAML editor.

The present technology, roughly described, provides an intelligent editor for creating a pipeline configuration file. The pipeline configuration file can be a YAML configuration file or in some other data serialization language. The intelligent editor is in the form of a YAML editor that provides multiple user interfaces for editing a pipeline configuration file. At least one interface of the YAML editor provides for creating and modifying the YAML configuration file code itself, and at least one interface provides for creating and modifying the configuration file through a visual interface which utilizes graphical icons.

In some instances, a YAML configuration file is a human readable configuration file in data serialization language. YAML can stand for "yet another markup language."

The YAML editor interface that provides for editing YAML configuration file code includes an intelligent field and value recommendation feature, auto-complete feature, a semantic error detection feature, and a field documentation feature. The intelligent recommendation feature recognizes the nested level and entity at which a user (e.g., programmer) is attempting to enter or edit code. With the nested level information and entity information, the system retrieves the allowed fields and/or data values for a particular field from a single stitched schema. The retrieved allowed fields and/or data may be provided to the user as a drop-down menu that the user can select from. The auto completion feature detects when the user has entered between one to five or more characters for an entry (field, data, and so on). The editor that retrieves matching fields or data as appropriate, and auto suggests them for the user. The semantic error detection feature automatically validates the configuration code based on a schema and at a particular event (such as, for example, user request, completion of a field, or period of time), and provides a visual icon (such as a graphical icon) and/or a marker in the code (such as a highlight) that indicates a portion of the code includes a semantic error. The field documentation field provides explanatory documentation for a field or other entity in the YAML configuration code when an input is received (such as, for example, a mouse hovering over the entity) over the entity. The documentation can be provided in the form of a pop-up window or in some other mariner.

The configuration file created and modified in the YAML editor can be based on a schema. In some instances, the schemas is based on several remote microservices, such as a continuous integration (CI) and continuous delivery (CD). Each microservice may have its own schema. The present system accesses the schemas from each of the remote microservices and combines then into a single stitched schema to be used with the YAML editing tool. In some instances, one or more microservice schemas are converted from their original format into a second format, such as a JSON format schema, before being stitched together.

The present system addresses a technical problem of efficiently creating a configuration code for a pipeline based on multiple remote microservices, each with their own schema. Creating a YAML configuration file in previous systems was often trial and error—create the configuration file as best as possible and then see if it works through execution. To create a configuration file that complies with the schemas of multiple remote microservice is even more complicated, especially when the configuration file has ten or more nested levels of code.

The present system provides a technical solution to the problem of efficiently creating YAML configuration files by providing a YAML editor that includes both a rich code-based editor and a visual graphical icon based editor. The rich code-based editor assists a user by automatically creating a single stitched schema derived from the schema of all the microservices the YAML is based on, and using the single schema to suggest fields, data values, perform validation of the code and detect semantic errors, as well as provide an auto-complete feature. The visual editor assists even further by viewing the configuration code components in a visual format consisting of graphical icons.

FIG. 1 is a block diagram of a system for providing a YAML editor. FIG. 1 includes application server 110, YAML server 120, client server 130, network 140, micro-service 150, micro-service 160, a micro service 170. YAML server 120 allows a user 194 at client server 130 to generate and modify a YAML configuration file using YAML application 125. The YAML application can apply the configuration file to one or more applications executing on application server 110. YAML application 125 is discussed in more detail with respect to FIG. 2.

Network 130 may be implemented by one or more networks suitable for communication between electronic devices, including but not limited to a local area network, wide-area networks, private networks, public network, wired network, a wireless network, a Wi-Fi network, an intranet, the Internet, a cellular network, a plain old telephone service, and any combination of these networks. Although network 130 is illustrated as existing between only YAML sever 120 and microservices 150-170, the network may exist between and facilitate communication between all servers and machines of FIG. 1.

Micro-services 150 through 170 may communicate with YAML application 125 through network 140. Each microservice may offer a particular service, such as continuous integration, continuous deployment, or some other service. Each microservice may include a schema and provide its schema to YAML application 125 on server 120.

Figure 2:
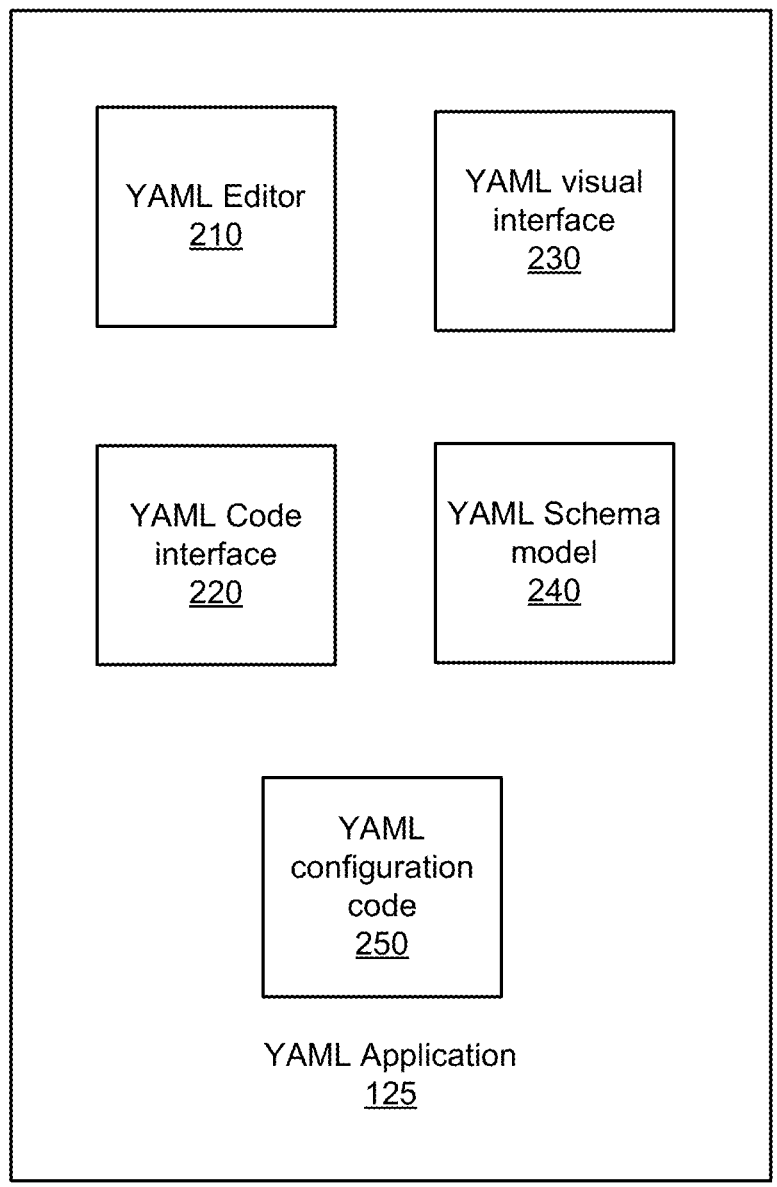
FIG. 2 is a block diagram of a YAML application.

FIG. 2 is a block diagram of a YAML application. The YAML application of FIG. 2 provides more detail for the YAML application FIG. 1. YAML application 125 includes YAML editor 210, YAML code interface 220, YAML visual interface 230, YAML schema model 240, and YAML configuration code 250. YAML editor module 210 implements an editor for creating, modifying, and editing a YAML configuration file. In some instances, the YAML configuration file is a pipeline configuration file. The editor 210 may provide and manage a user interface for editing the YAML configuration file. A YAML configuration file 240 may be generated by YAML editor 210 through interfaces provided by the YAML code interface module 220 and the YAML visual interface module 230.

YAML code interface 220 implements a user interface within the YAML editor for editing YAML configuration code directly. YAML code interface 220 may also manage the display of field descriptions, field suggestions, field auto complete, alerts, and other features within an interface for editing YAML configuration code.

YAML visual interface 230 may implement a user interface, within the interface provided by editor 210, for graphically modifying and creating a YAML configuration file. Visual interface module 230 implements a graphical interface for managing an architecture pipeline, and execution pipeline, and other elements of a YAML configuration code in a visual manner. The visual interface may utilize graphical icons for pipeline phases and steps, and include multiple input boxes or other elements for configuration file fields and data values.

YAML schema model 240 may access schemas from one or more micro-services and construct a single stitched schema. To generate the single schema, schema model 240 may convert one or more received micro-service schemas into a different format, and then stitch the converted schemas together to form one schema.

Figure 3:
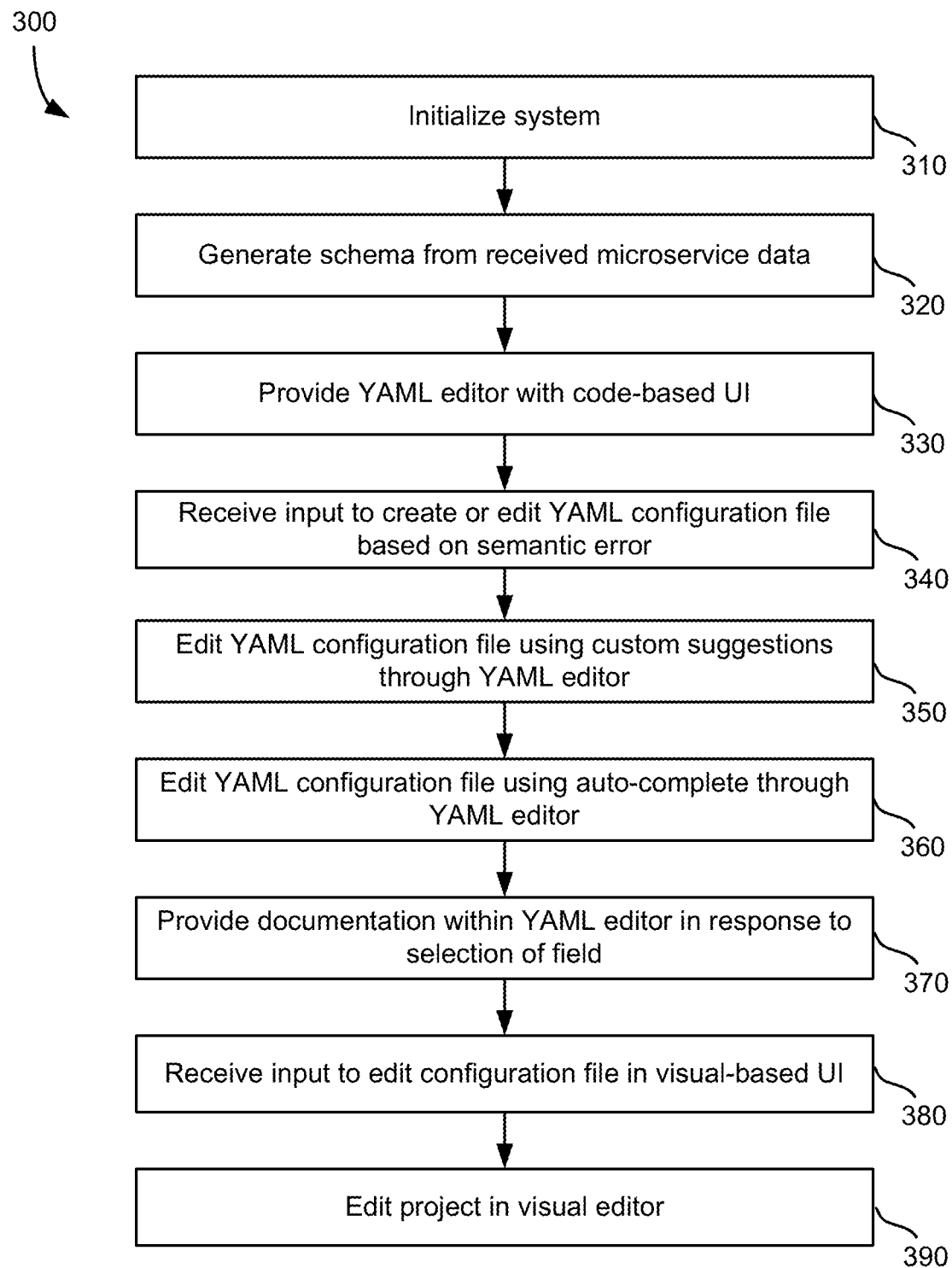
FIG. 3 is a method for providing a YAML editor.

FIG. 3 is a method for providing a YAML editor. The method of FIG. 3 begins with initializing the YAML application. Initializing the application may including performing boot up and other initialization operations and procedures. Next, a schema is generated from one or more received micro-service schemas at step 320. In some instances, each micro-service operating on a remote machine may send one or more sets of schema to the YAML application over network 140. The single schema is generated from the one or more microservice schemas. More details for generating schema from received micro-service data is discussed with respect to FIG. 4.

A YAML editor is provided at step 330. The YAML editor, which can be provided with a code editing user interface or a visual graphics-based user interface, can be provided through a client application on a client device, as one or more network pages (e.g., web pages) through a network browser application on a client device, or in some other mariner. Initially, the YAML editor can be provided with a code-based editing user interface (UI) or a visual-based UI. For purposes of discussion, a code-based UI will be discussed with respect to step 330.

In the code-based UI of the YAML editor, a user may create, modify, edit, and delete portions of the YAML pipeline configuration code. As the works on code in the code-based UI, the editor may automatically implement several features. These features are discussed at least with respect to steps 340-370 and FIGS. 10-14.

Input is received to create or edit the YAML configuration file based on a schema error at step 340. In some instances, as a user creates a YAML configuration file, the file is consistently validated against a schema to detect any existing semantic errors. As semantic errors are detected, alerts are made to indicate to the user where the errors are in the code. More details for receiving input to create or edit a YAML configuration file based on schema error is discussed with respect to the method of FIG. 5.

A YAML configuration file is edited using custom suggestions through a YAML code-based editing user interface at step 350. In some instances, a user may create fields and other elements within a YAML configuration file. It can be tedious and time-consuming to look up what values the fields may be used at different points in the configuration file, or what elements or entities can go in a particular portion of YAML configuration files. The present technology suggests custom suggestions that would be acceptable for the particular field or element at which the user is currently editing. Editing a YAML configuration file using custom suggestions through a YAML editor is discussed in more detail below with respect to FIG. 6.

A YAML configuration file can be edited with the assistance of an auto complete feature in the YAML code-based UI at step 360. In some instances, as a user types one, two, or more characters at a particular position in the configuration file, the YAML application may perform a search to see what references or elements (fields, data values, and so forth) may complete what the user has started to type. More details for editing a YAML configuration file using auto complete through a YAML editor is discussed with respect to the method of FIG. 7.

Documentation may be provided within a YAML editor in response to the selection the field at step 370. Providing documentation may include receiving an input of a portion of the YAML configuration code, for example by hovering a mouse over the particular field. With the field selected by a hovering input, the system may perform a query to determine if documentation data exist for the particular selected field or elements. The documentation may be stored with the schema, in a table associated with the particular element, or in some other format. If the documentation data exists, the documentation is returned to the YAML application and output within the interface for the user. The documentation can indicate parameters or other features of the selected element to assist a user with understanding the current element and how to complete it within the configuration file.

At some point during editing of the configuration file within the YAML code-based editor UI, input may be received to edit the project in visual mode at step 380. Once input is received to edit the project in visual mode, the visual-based editor UI is instantiated and populated with elements from the configuration file. The project may then be edited in the visual-based editor UI at step 390. Editing a project, such as a YAML configuration file, in a visual editor is discussed in more detail below with respect to the method of FIG. 8.

Though the steps in FIG. 3 are listed in a particular order, the order is merely for discussion purposes. The steps of FIG. 3 can occur in any order, and in some cases some steps may not be performed at all. The order and existence of the steps in FIG. 3 is not intended to be limiting.

Figure 4:
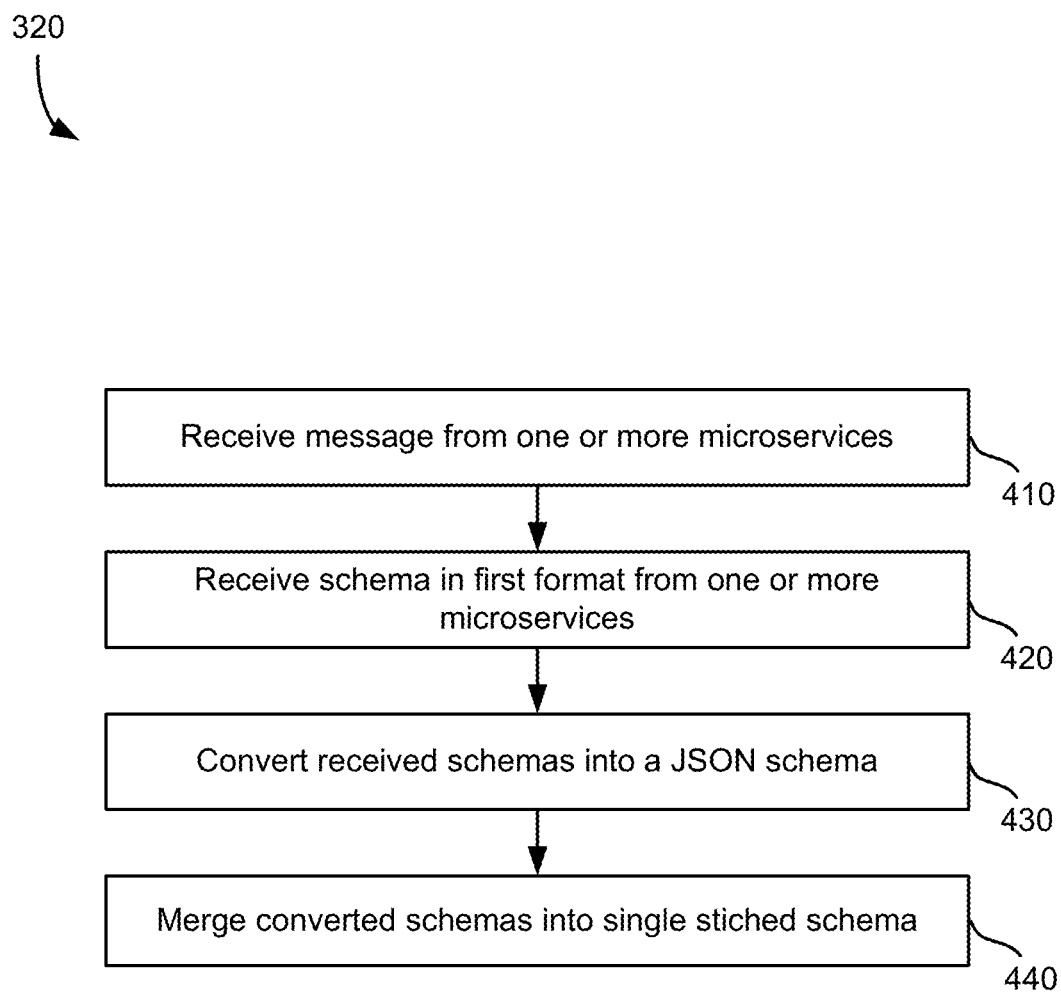
FIG. 4 is a method for generating a schema from received micro-service data.

FIG. 4 is a method for generating a schema from received micro-service data. The method of FIG. 4 provides more detail for step 320 of the method of FIG. 3. First, a message is received by the YAML application and from one or more micro-services at step 410. Each message may indicate that the particular micro-service has a schema it would like to share with the YAML application. Schema is received in a first format from one or more micro-services at step 420. In some instances, the first format may be a swagger schema. The received schemas are converted to a second format at step 430. In some instances, the second format may be a JSON schema. Once received, the converted schemas may be merged into a single stitched schema at step 440. The single stitched schema can be saved locally at the YAML server or at a remote datastore.

Figure 5:
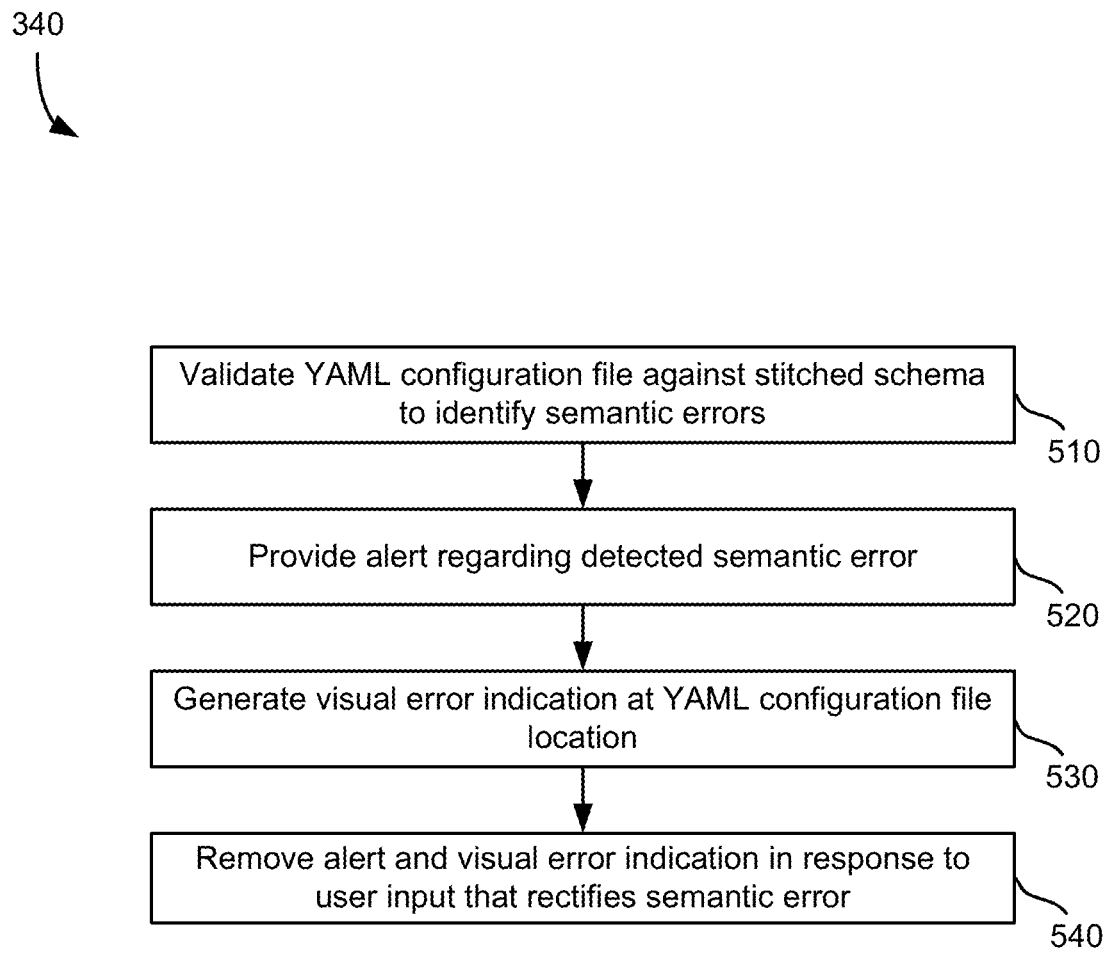
FIG. 5 is a method for receiving input to create or edit a YAML configuration file.

FIG. 5 is a method for receiving input to create or edit a YAML configuration file based on a semantic error. The method of FIG. 5 provides more detail for step 340. A YAML configuration file is validated against the single stitched schema to identify semantic errors at step 510. The stitched schema can indicate requirements of different nested layers of the YAML configuration file, required elements, and other data. After validating the YAML configuration file against the stitched schema, an alert may be provided regarding the detected semantic errors for the configuration file at step 520. The alert may include a visual indicator indicating that some semantic issues have been found within the configuration file. Selection of the alert icon may reveal more details for the alerts. In addition, a visual error indication may be generated at the YAML configuration code at the location associated with the detected semantic errors at step 530. For example, if a semantic air was detected for the fifth line of the YAML configuration file code, the portion of line 5 that is includes the error may be highlighted with a particular color. Once user correct the one or more errors, the alert and visual error indication may be removed in response to the user input that rectifies the semantic error at step 540.

Figure 6:
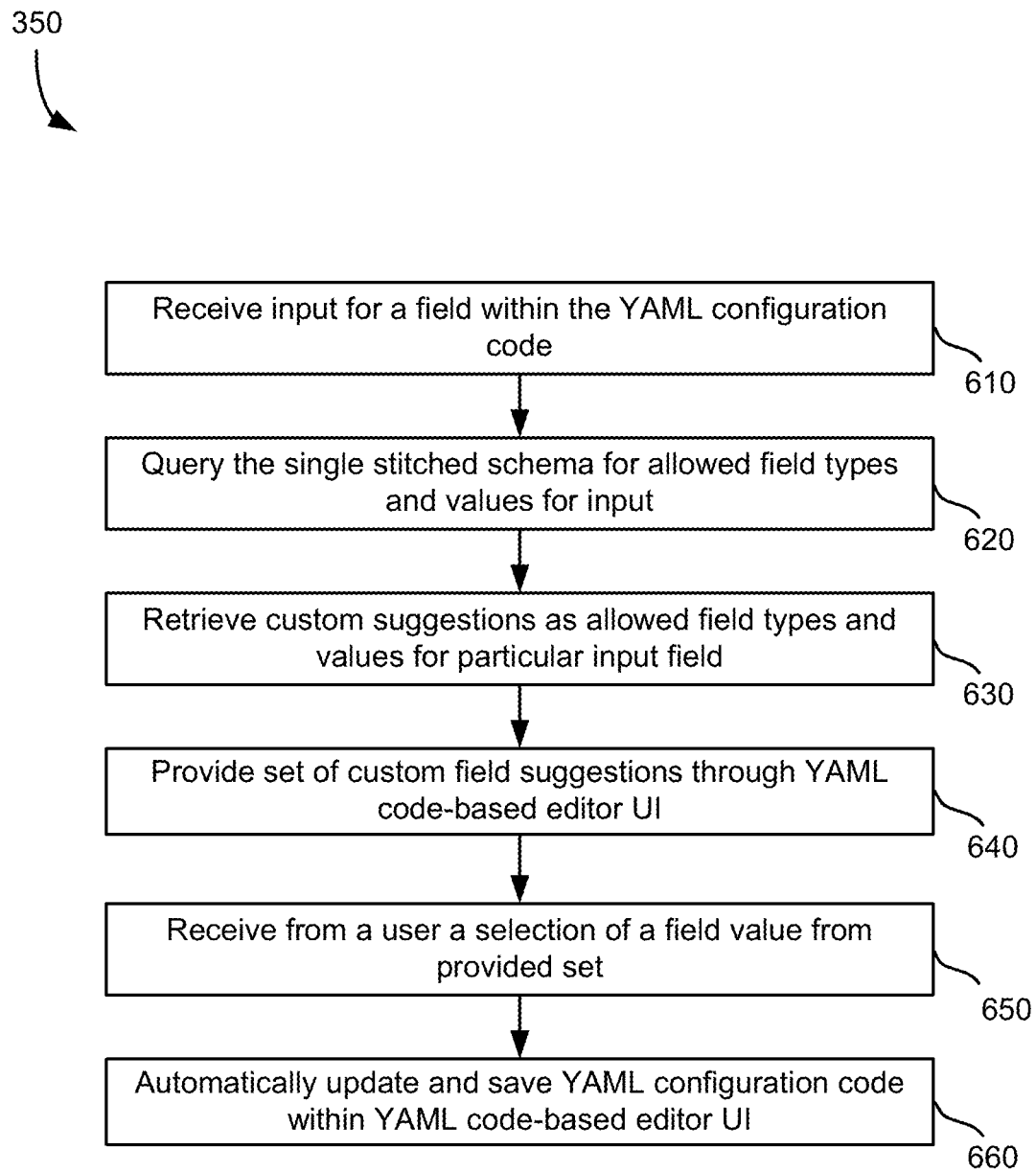
FIG. 6 is a method for editing a YAML configuration file using custom suggestions.

FIG. 6 is a method for editing a YAML configuration file using custom suggestions. The method of FIG. 6 provides more detail for step 350 the method of FIG. 5. First, input is received for a field within the YAML configuration code within the code-based editor UI at step 610. The single stitched schema is queried for the allowed field types and values for the particular input at step 620. Custom suggestions are then retrieved as allowed field types and values for the received field at step 630. Custom suggestions may include connectors, secrets, pipeline variables, and other elements associated with the input at step 610. A set of custom field suggestions is then provided to a user through the YAML code editor at step 640. In some instances, the custom suggestions may be provided as a drop-down menu at the point where the user is entering code. A selection may be received from a user, for example as a selection of an entry in the drop-down menu, through the user interface at step 650. Once the selection is received, the entry is automatically entered into the configuration file, and the YAML configuration file is automatically updated and saved within the code-based editor UI at step 660.

Figure 7:
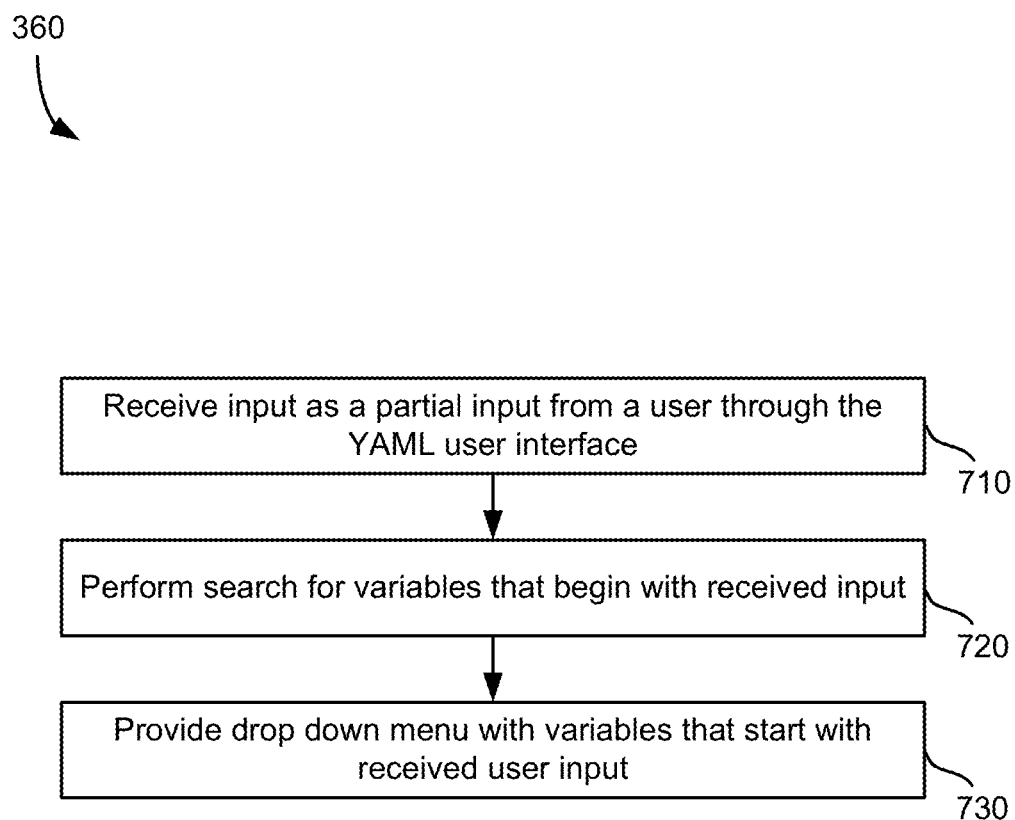
FIG. 7 is a method for editing a YAML configuration file using auto complete.

FIG. 7 is a method for editing a YAML configuration file using auto complete. The method of FIG. 7 provides more detail for step 360 of the method of FIG. 3. Input is received as a partial input from a user through the YAML user interface at step 710. A search is performed for variables that begin with the received input at step 720. The search may be applied to the single stitched schema or a table or other data structure having values that are created from the single stitched schema. Once the search is completed, the search results are provided within a drop-down menu as variables that start with the received user input at step 730 within the YAML user interface.

Figure 8:
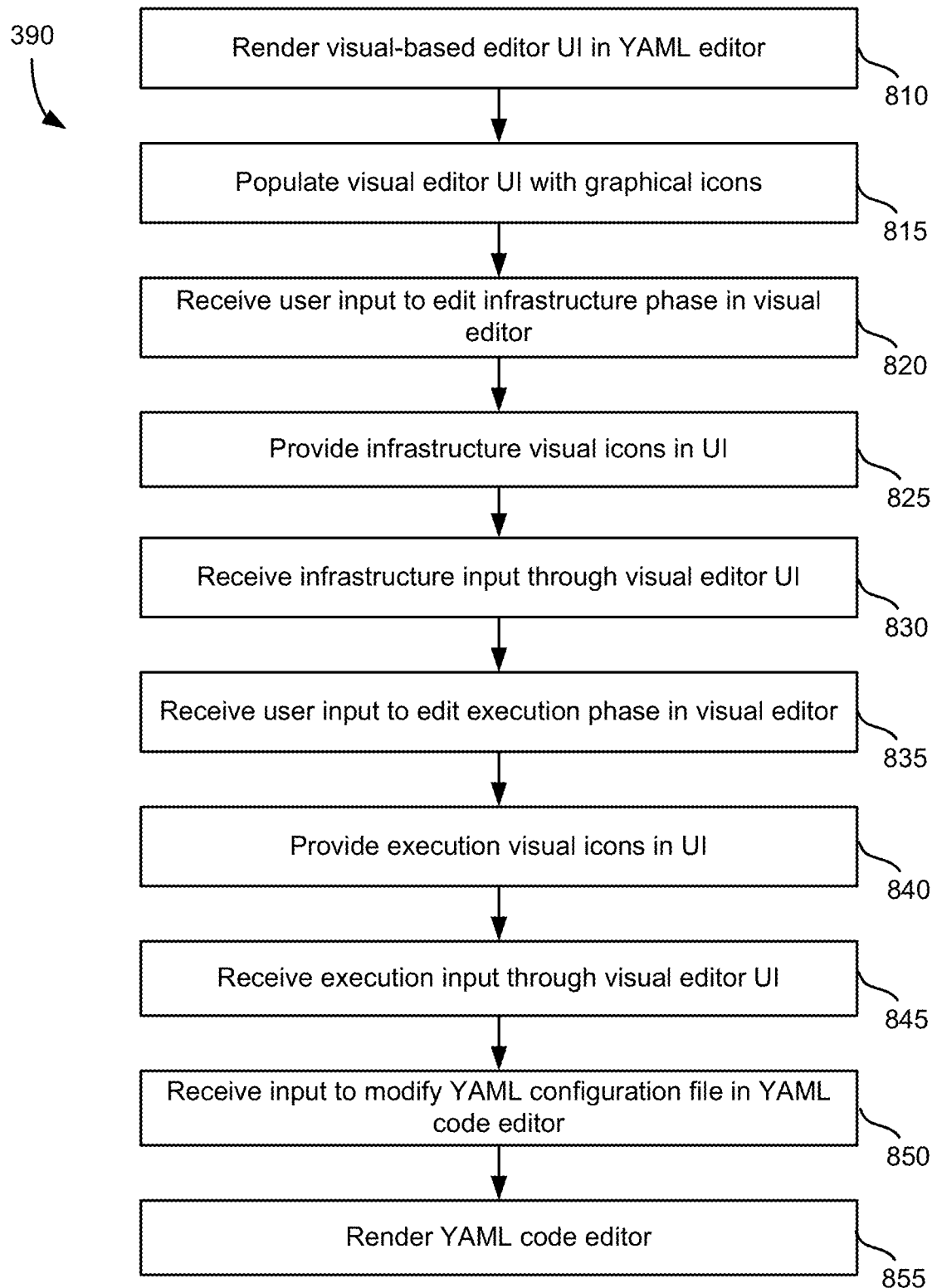
FIG. 8 is a method for editing a project in a visual editor.

FIG. 8 is a method for editing a project in a visual editor. The method of FIG. 8 provides more detail for step 390 of the method of FIG. 3. First, a visual-based editor UI is rendered in the YAML editor at step 810. The visual-based editor UI is then populated with graphical icons representing the YAML configuration file at step 815. The graphical icons may represent portions of a pipeline, pipeline phases, steps within a phase, and/or other information associated with the architecture or execution of the configuration file.

User input may be received to edit an infrastructure phase in the visual-based UI at step 820. The infrastructure visual icons may be provided in the user interface at step 825. The visual icons may represent an infrastructure phase, steps within a phase, or other elements. The infrastructure input may then be received through the visual editor UI at step 830. User input to edit an execution phase within the visual editor UI is received at step 835. The execution visual icons are provided in user interface at step 840. The visual icons may represent an execution phase, steps within a phase, or other elements Execution input is then received through the visual editor UI at step 845. Input is an received to modify the YAML configuration file in a YAML code editor at step 850. At this point, the YAML code editor is rendered for the user to modify at step 855.

Figure 9:
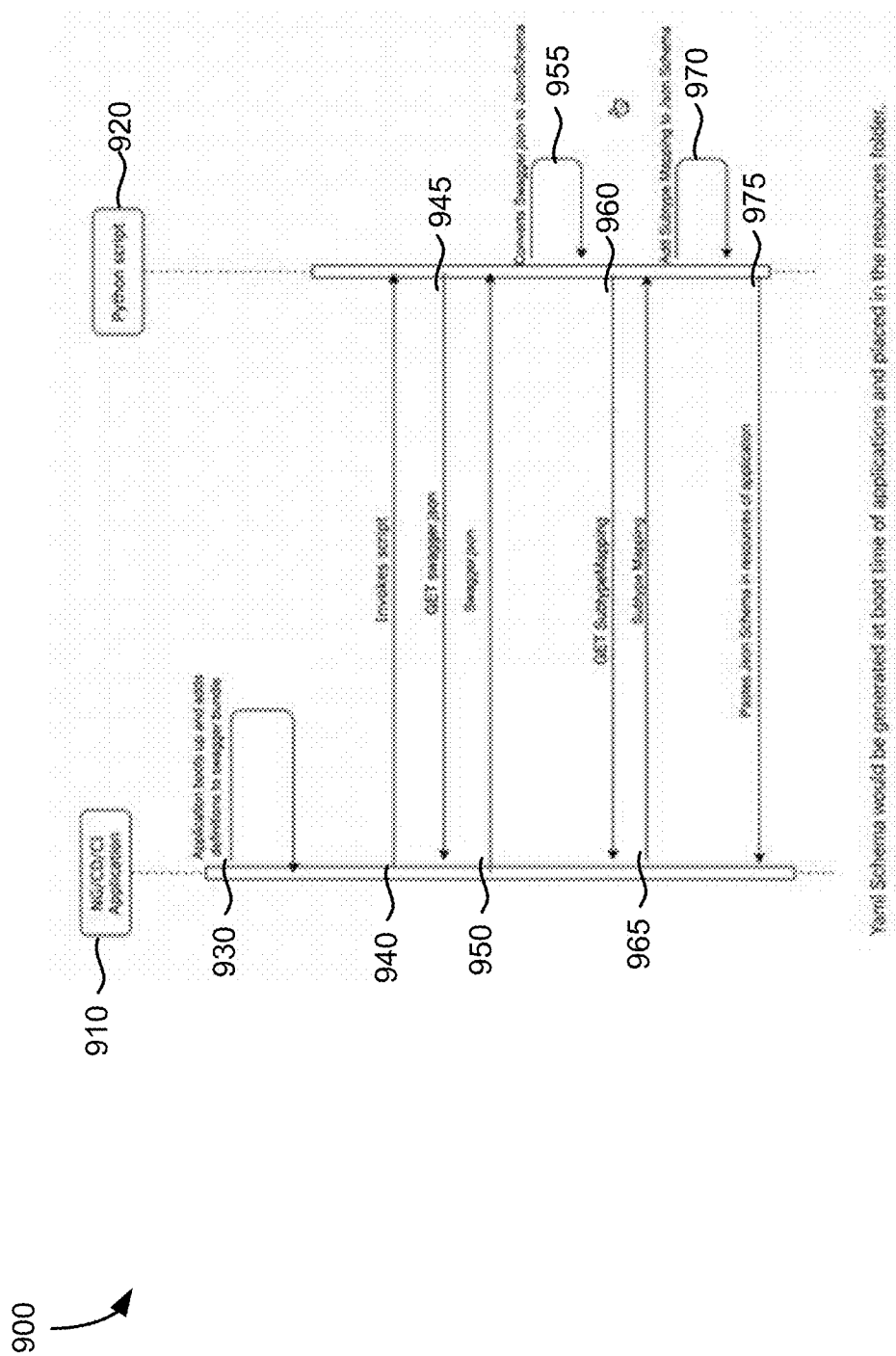
FIG. 9 is a flowchart for generating YAML schema at boot time

FIG. 9 is a flowchart for generating YAML schema at boot time. In the flowchart of FIG. 9, a micro service application 910 boots up and adds definitions to swagger bundles at step 930. The micro service may send a message to invoke a script to at YAML sever 120 at step 940. In some instances, at least a portion of the YAML server may be implemented with Python script. A GET swagger.json message is sent by the Python script (YAML server) to the micro service at step 945. A swagger.json message is then sent by the micro service to the Python script at step 950. The swagger.json data is converted to json.schema data at step 955. The Python script then sends a GET subtype.mapping message to the microservice at step 960. A subtype mapping message is then sent from the micro service to the YAML server python script at step 965. The subtype mapping is added to the json schema at step 970. Finally, the json schema is pasted in resources of the application at step 975.

Figure 10:
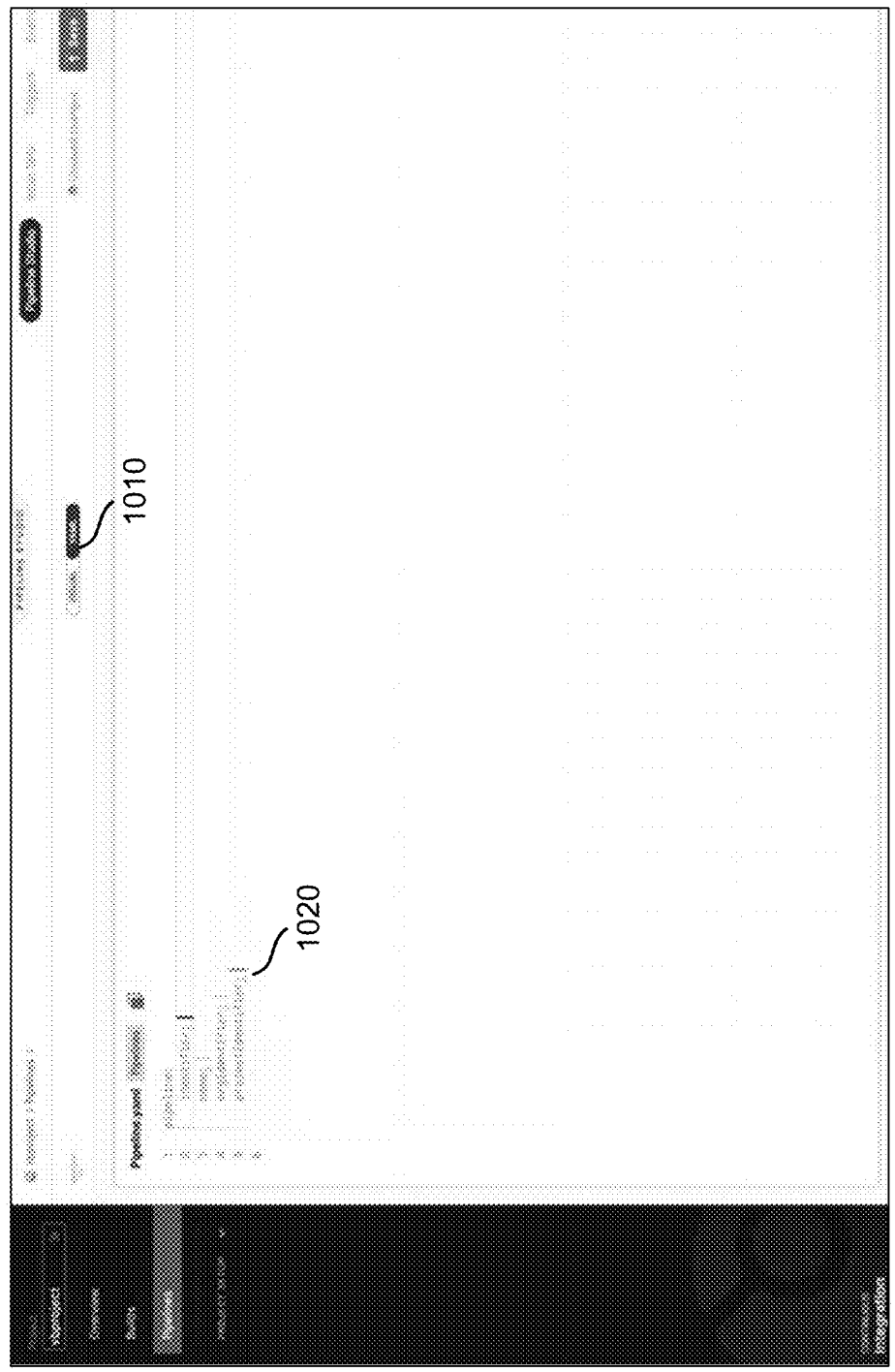
FIG. 10 is an interface for creating a pipeline.

FIG. 10 is an interface for creating a pipeline. In interface 1000 of FIG. 10, the YAML code-based editor UI is selected at icon 1010. As such, a user will be able to edit a YAML configuration file code in interface 1000. When starting to create a YAML pipeline configuration file, pipeline with some basic elements code is generated, as shown by code 1020. The initial pipeline code elements include an identifier, name, organization identifier, and project identifier.

Figure 11:
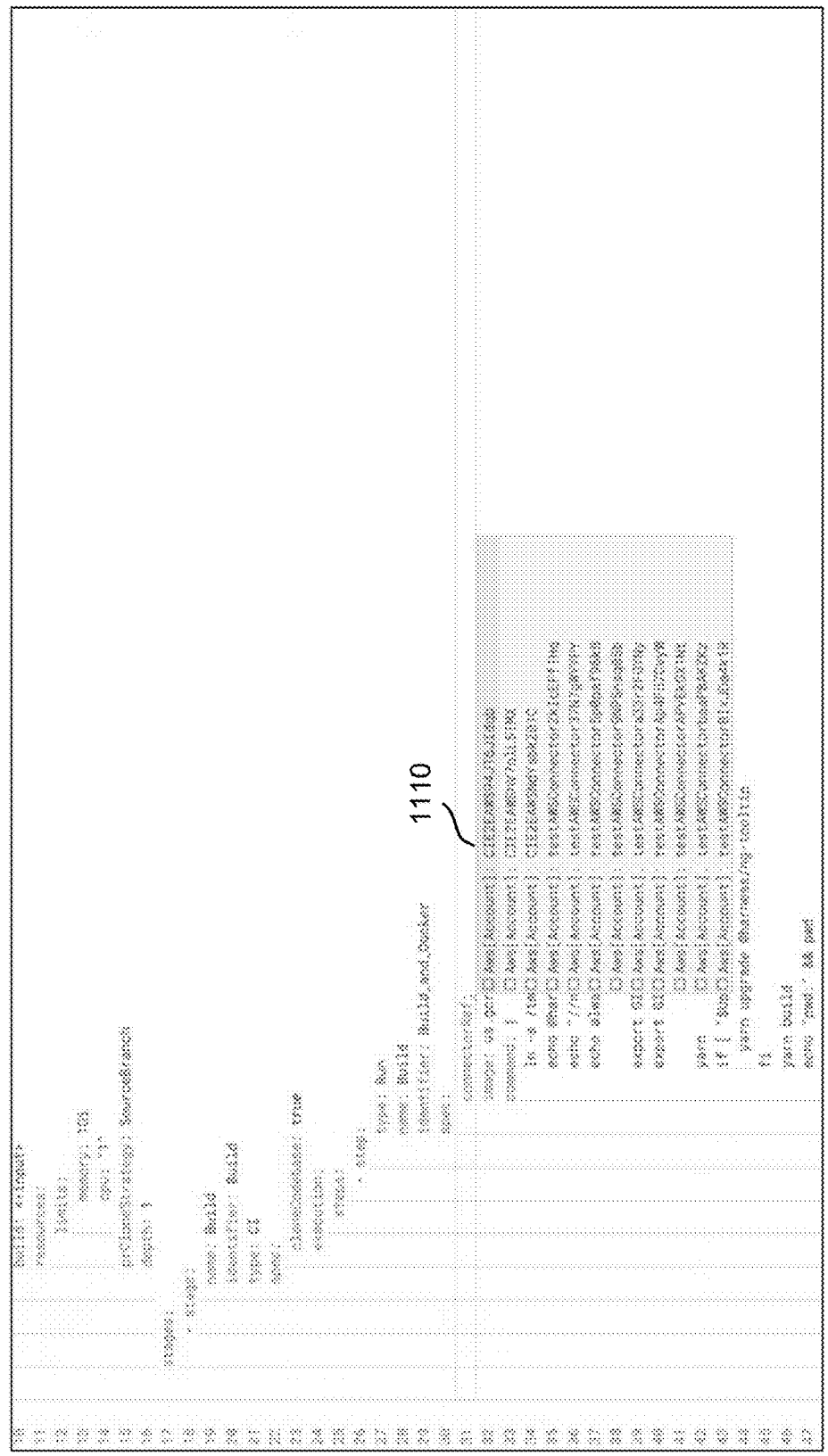
FIG. 11 is an interface for providing a drop-down menu of field values.

FIG. 11 is an interface for providing a drop-down menu of suggested values. Interface 1100 of FIG. 11 shows YAML configuration code with a drop-down menu 1110 presented at a field "connectorref." The drop-down menu includes different values that can be included after the connector ref field.

Figure 12:
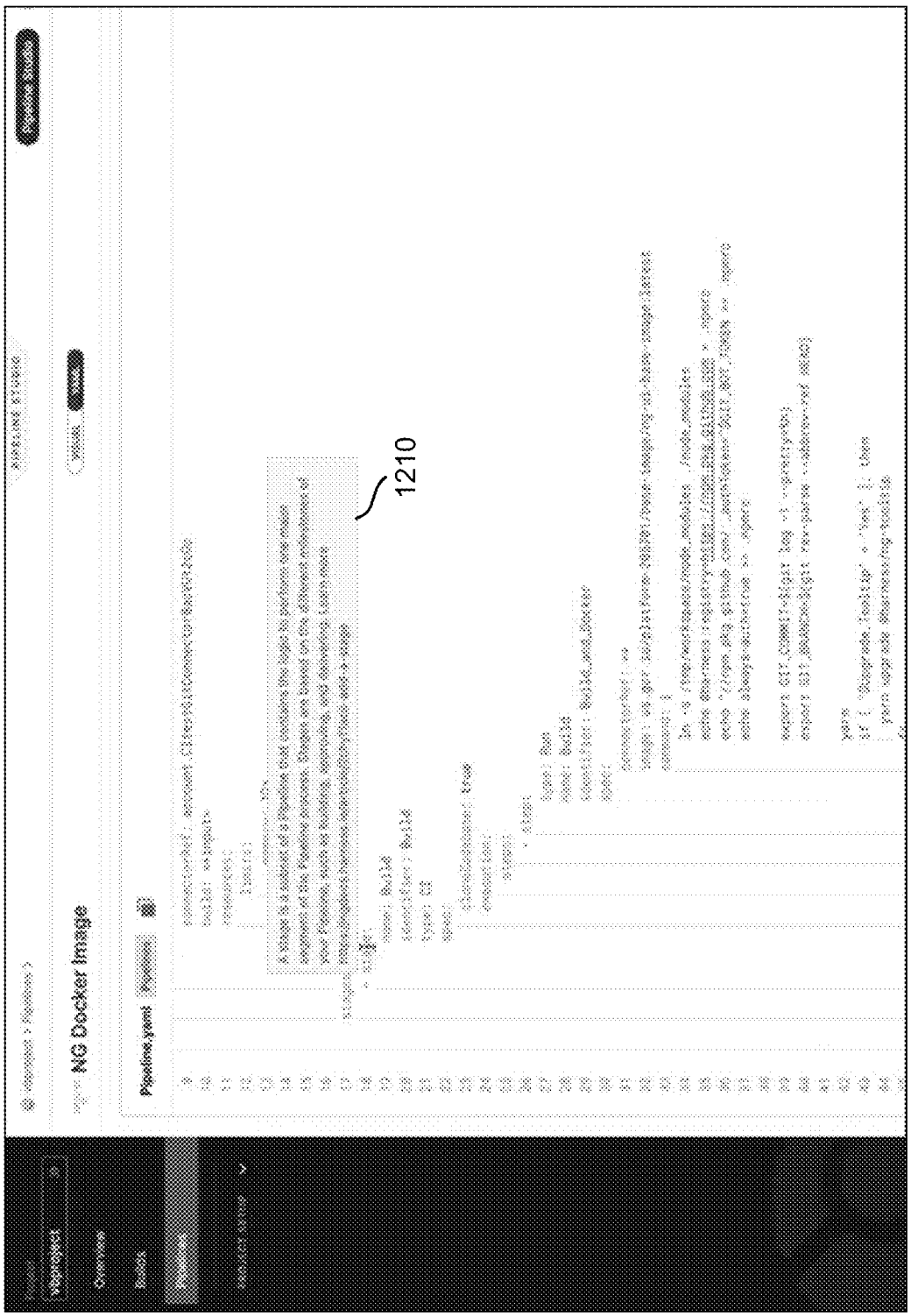
FIG. 12 is an interface providing documentation for a field.

FIG. 12 is an interface providing documentation for a field. Interface 1200 of FIG. 12 illustrates a hover action over a particular word "stage.". Upon detecting the hovering input, the user interface may retrieve documentation for that word, if any exists. In the present interface 1200, the documentation indicates "a stage is a subset of a pipeline that contains the logic to perform one major segment of the pipeline process. Sages are based on the different milestones of your pipeline, such as building, approving, and delivering." In some instances, a website address is provided to the user so the user can learn more information if desired.

Figure 13:
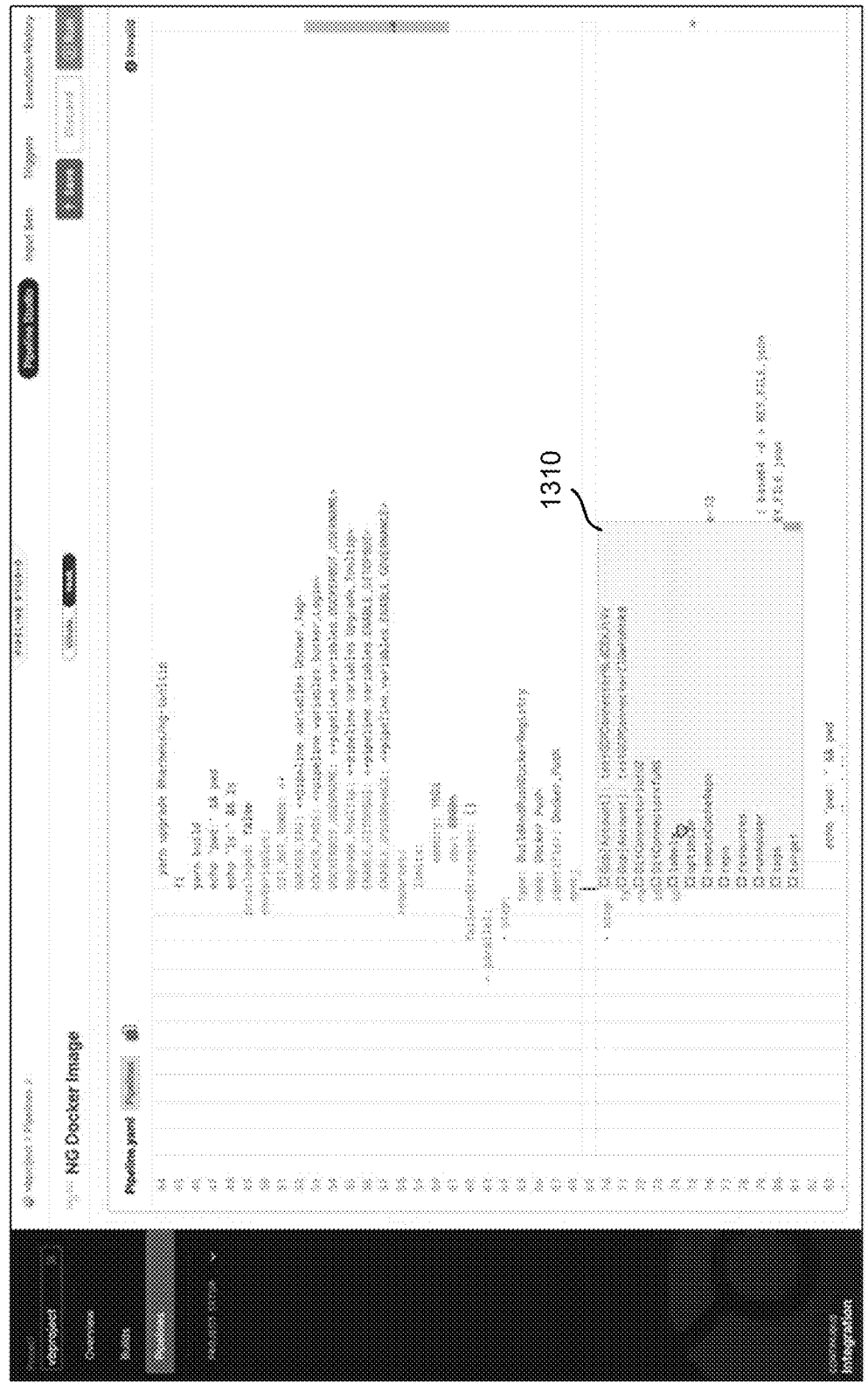
FIG. 13 is an interface showing portions of a specification to be entered into Y and ML code.

FIG. 13 is an interface showing portions of a specification to be entered into a YAML pipeline configuration file. Interface 1300 of FIG. 13 includes a drop-down list of elements that may be entered as values to the "spec" field. When a user selects a specification field, for example by hovering over the spec field, a drop-down of spec values to be added after the spec field may be provided in window 1310.

Figure 14:
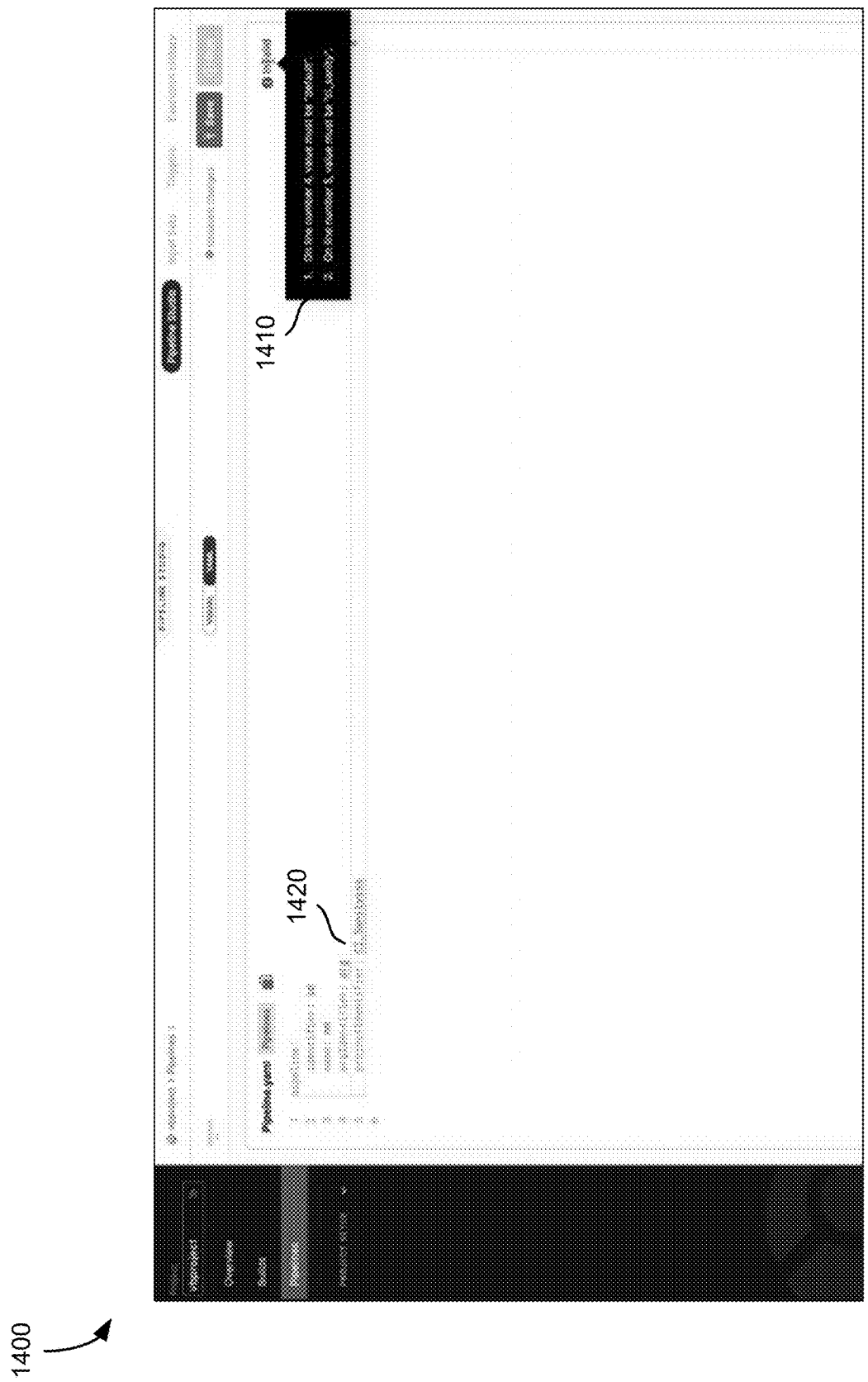
FIG. 14 illustrates alerts within an interface regarding the semantic errors.

FIG. 14 illustrates alerts within an interface regarding the semantic errors. As a user generates a YAML configuration file, the file is validated against a single stitched schema. The validation detects semantic errors in the actual configuration file code. If semantic errors are detected, a visual indicator 1410 may be generated within user face. The visual indicator may indicate one or more errors within the code. Additionally, portions of the code associated with the semantic error may be highlighted, as shown by highlight 1420. Once the semantic errors are corrected by a user, both the alerts and highlights to the code with the errors will be removed from the UI.

Figure 15:
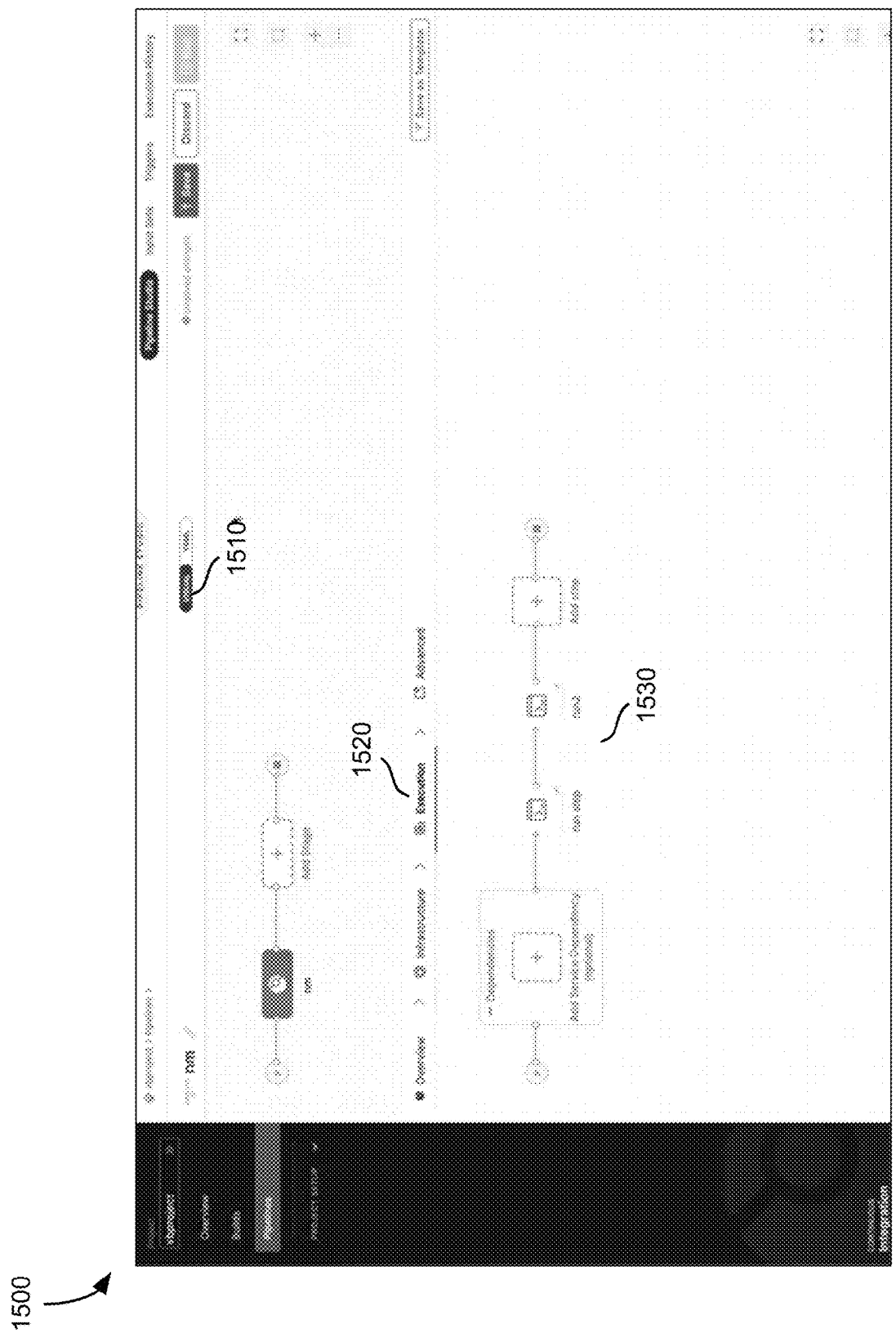
FIG. 15 illustrates a visual representation of an interface for constructing an execution pipeline.

FIG. 15 illustrates a visual-based YAML file editor UI for constructing an execution pipeline. In interface 1500 of FIG. 15, the visual editor is selected at selector 1510 and being provided to a user within the YAML editor. Within the visual editor UI, graphical icons are used to show different portions for an execution phase of the configuration file, as selected by selector 1520. Graphical icons 1530 illustrate steps within the execution phase that are to take place upon execution of the YAML pipeline configuration file.

Figure 16:
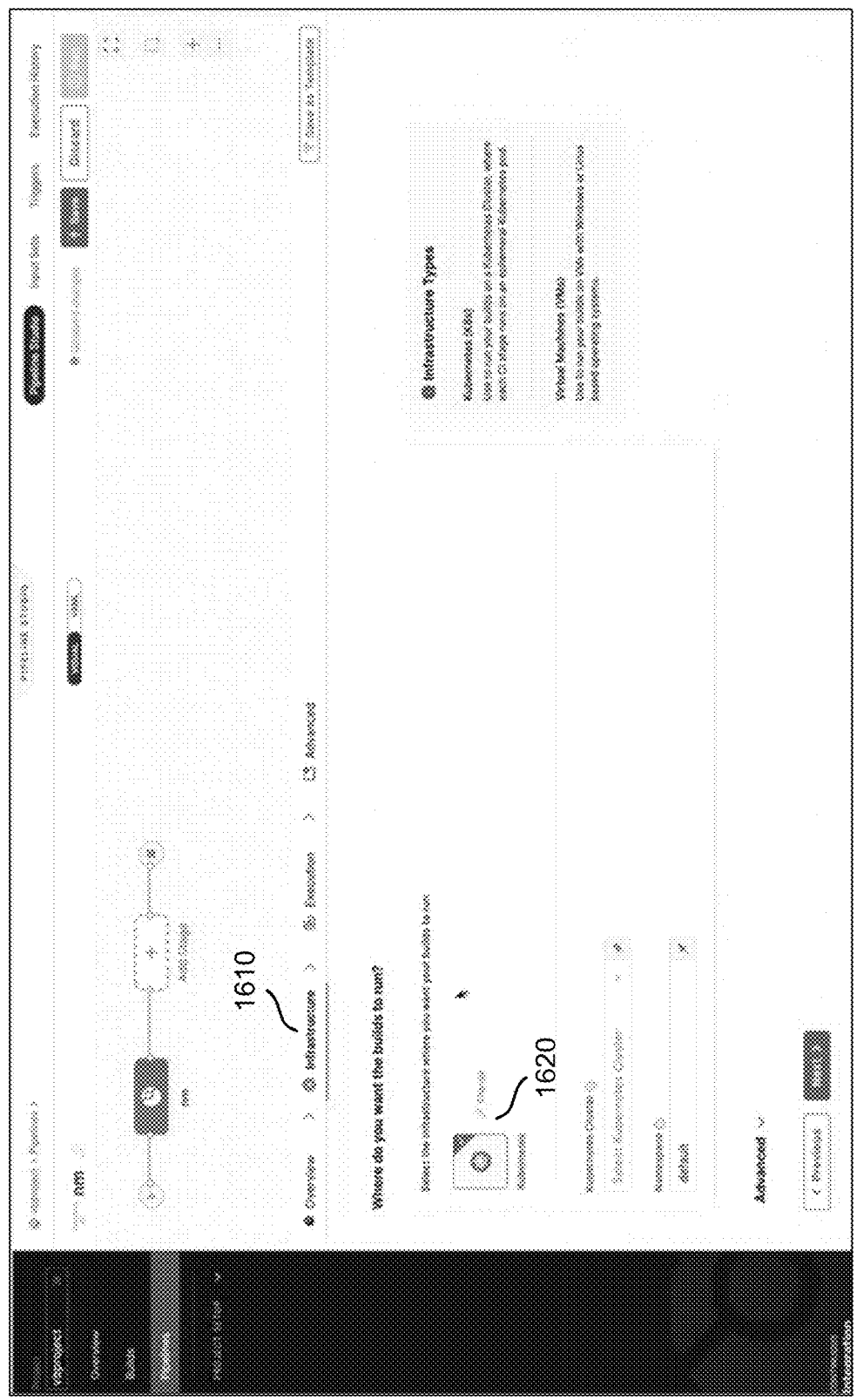
FIG. 16 illustrates a visual representation of the interface for constructing an infrastructure pipeline.

FIG. 16 illustrates a visual-based YAML editor UI constructing an infrastructure pipeline. Interface 1600 of FIG. 16 illustrates an infrastructure phase of a visual Y MAL editor, as selected by selector 1610. The infrastructure phase currently includes step 1620 represented as a graphical icon. Additional steps can be added to the infrastructure set forth by the YAML pipeline configuration file.

Figure 17:
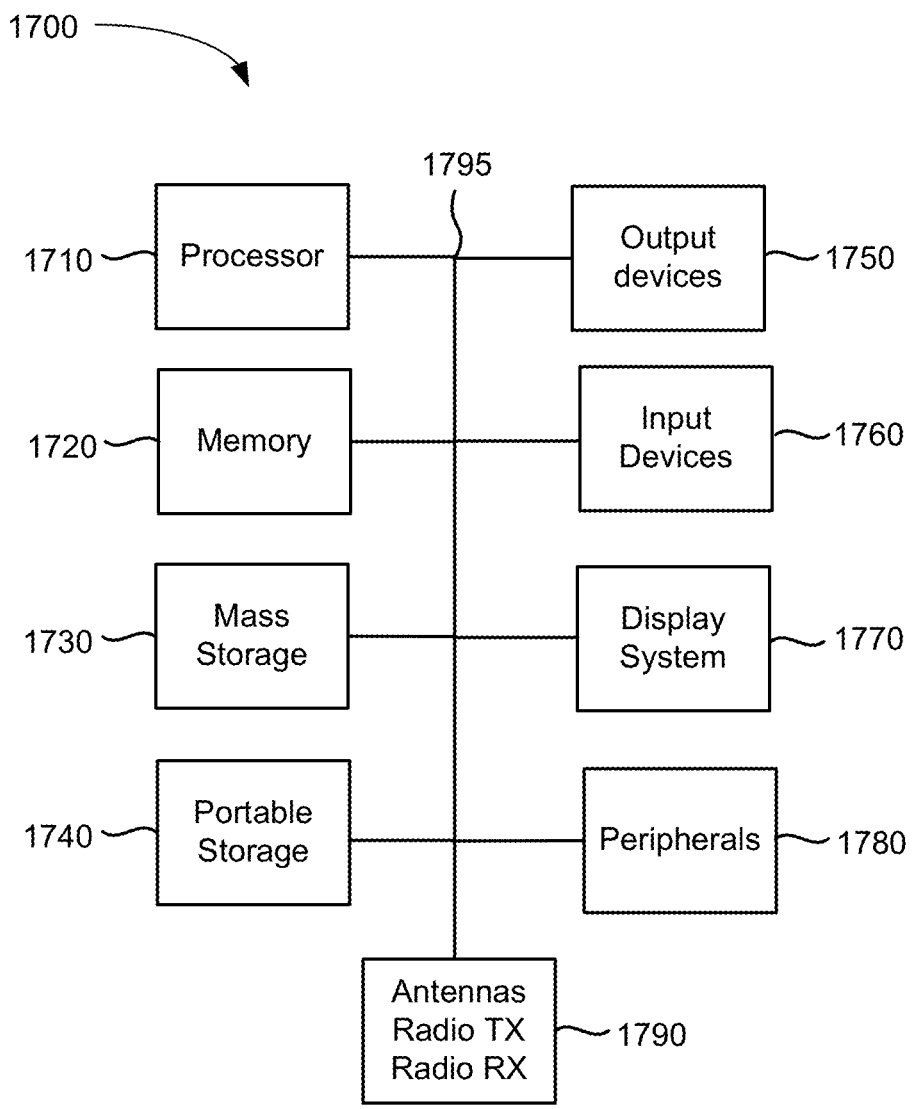
FIG. 17 provides a computing environment for implementing the present technology.

FIG. 17 is a block diagram of a computing environment for implementing the present technology. System 1500 of FIG. 15 may be implemented in the contexts of the likes of machines that implement application server 110, YAML sever 120, client server 130, devices of network 140, and microservices 150-170. The computing system 1700 of FIG. 17 includes one or more processors 1710 and memory 1720. Main memory 1720 stores, in part, instructions and data for execution by processor 1710. Main memory 1720 can store the executable code when in operation. The system 1700 of FIG. 17 further includes a mass storage device 1730, portable storage medium drive(s) 1740, output devices 1750, user input devices 1760, a graphics display 1770, and peripheral devices 1780.

The components shown in FIG. 17 are depicted as being connected via a single bus 1790. However, the components may be connected through one or more data transport means. For example, processor unit 1710 and main memory 1720 may be connected via a local microprocessor bus, and the mass storage device 1730, peripheral device(s) 1780, portable storage device 1740, and display system 1770 may be connected via one or more input/output (I/O) buses.

Mass storage device 1730, which may be implemented with a magnetic disk drive, an optical disk drive, a flash drive, or other device, is a non-volatile storage device for storing data and instructions for use by processor unit 1710. Mass storage device 1730 can store the system software for implementing embodiments of the present invention for purposes of loading that software into main memory 1720.

Portable storage device 1740 operates in conjunction with a portable non-volatile storage medium, such as a floppy disk, compact disk or Digital video disc, USB drive, memory card or stick, or other portable or removable memory, to input and output data and code to and from the computer system 1700 of FIG. 17. The system software for implementing embodiments of the present invention may be stored on such a portable medium and input to the computer system 1700 via the portable storage device 1740.

Input devices 1760 provide a portion of a user interface. Input devices 1760 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1700 as shown in FIG. 17 includes output devices 1750. Examples of suitable output devices include speakers, printers, network interfaces, and monitors.

Display system 1770 may include a liquid crystal display (LCD) or other suitable display device. Display system 1770 receives textual and graphical information and processes the information for output to the display device. Display system 1770 may also receive input as a touch-screen.

Peripherals 1780 may include any type of computer support device to add additional functionality to the computer system. For example, peripheral device(s) 1780 may include a modem or a router, printer, and other device.

The system of 1700 may also include, in some implementations, antennas, radio transmitters and radio receivers 1790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1700 of FIG. 17 are those typically found in computer systems that may be suitable for use with embodiments of the present invention and are intended to represent a broad category of such computer components that are well known in the art. Thus, the computer system 1700 of FIG. 17 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for modifying a pipeline configuration file, comprising:
   receiving, by a YAML editor module executing on a first server, a plurality of schemas from a plurality of microservices, at least one of the plurality of schemas having a first format;
   merging multiple schemas derived from the received schemas into a single stitched schema;
   receiving input, from a user through a YAML user interface, to modify a YAML file, the YAML user interface providing and allowing a user to edit the YAML file through both of a YAML code editor and a visual interface based on graphical icons, the graphical icons graphically representing pipelines, pipeline phases, and steps within a pipeline phase;
   retrieving, by the YAML editor module, custom field values associated with the received input, the custom field values retrieved at least in part from the single stitched schema
   semantically validating the input against the single stitched schema to determine one or more semantic validation errors;
   displaying an indication of the one or more semantic validation errors to the user;
   providing the custom field values in the UI to the user; and
   inserting one of the custom field values into the YAML file within the UI based on a user selection of the custom field values.

2. The method of claim 1, wherein at least one of the microservices is implemented on a second server.

3. The method of claim 1, wherein the first format is a SWAGGER schema.

4. The method of claim 1, wherein the YAML file is a YAML pipeline configuration file.

5. The method of claim 1, wherein the YAML user interface includes a first interface for modifying the YAML configuration file in code form and a second interface for modifying the YAML configuration file through a graphical interface that includes the graphical icons.

6. The method of claim 1, further comprising:
   receiving a selection, from the user through the user interface, to edit the YAML configuration file in a visual interface;

providing the visual interface through the user interface;
providing a graphical representation of the YAML configuration file through the visual interface; and
modifying the YAML configuration file based on modifications to the graphical representation made in the visual interface in response to user input received through the visual interface.

7. The method of claim 1,
wherein the indication of the one or more semantic validation errors includes a highlight in the code editor and a corresponding semantic validation error graphical icon in the graphical user interface, wherein both the code editor highlight and the semantic validation error graphical icon represent the same indication of the one or more semantic validation errors.

8. The method of claim 1, further including:
receiving input to select an entity of the YAML configuration file; and
displaying documentation for the selected entity within the YAML editor.

9. The method of claim 1, further comprising pre-populating child properties of a selected field completion into the YAML file.

10. A non-transitory computer readable storage medium having embodied thereon a program, the program being executable by a processor to perform a method for modifying a pipeline configuration file, the method comprising:
receiving, by a YAML editor module executing on a first server, a plurality of schemas from a plurality microservices, at least one of the plurality of schemas having a first format;
merging multiple schemas derived from the received schemas into a single stitched schema;
receiving input, from a user through a YAML user interface, to modify a YAML file, the YAML user interface providing and allowing a user to edit the YAML file through both of a YAML code editor and a visual interface based on graphical icons, the graphical icons graphically representing pipelines, pipeline phases, and steps within a pipeline phase;
retrieving, by the YAML editor module, custom field values associated with the received input, the custom field values retrieved at least in part from the single stitched schema;
semantically validating the input against the single stitched schema to determine one or more semantic validation errors;
displaying an indication of the one or more semantic validation errors to the user;
providing the custom field values in the UI to the user; and
inserting one of the custom field values into the YAML file within the UI based on a user selection of the custom field values.

11. The non-transitory computer readable storage medium of claim 10, wherein at least one of the microservices is implemented on a second server.

12. The non-transitory computer readable storage medium of claim 10, wherein the first format is a SWAGGER schema.

13. The non-transitory computer readable storage medium of claim 10, wherein the YAML file is a YAML pipeline configuration file.

14. The non-transitory computer readable storage medium of claim 10, wherein the YAML user interface includes a first interface for modifying the YAML configuration file in code form and a second interface for modifying the YAML configuration file through a graphical interface that includes the graphical icons.

15. The non-transitory computer readable storage medium of claim 10, further comprising:
receiving a selection, from the user through the user interface, to edit the YAML configuration file in a visual interface;
providing the visual interface through the user interface;
providing a graphical representation of the YAML configuration file through the visual interface; and
modifying the YAML configuration file based on modifications to the graphical representation made in the visual interface in response to user input received through the visual interface.

16. The non-transitory computer readable storage medium of claim 10,
wherein the indication of the one or more semantic validation errors includes a highlight in the code editor and a corresponding semantic validation error graphical icon in the graphical user interface, wherein both the code editor highlight and the semantic validation error graphical icon represent the same indication of the one or more semantic validation errors.

17. The non-transitory computer readable storage medium of claim 10, further including:
receiving input to select an entity of the YAML configuration file; and
displaying documentation for the selected entity within the YAML editor.

18. The non-transitory computer readable storage medium of claim 10, further comprising pre-populating child properties of a selected field completion into the YAML file.

19. A system for modifying a pipeline configuration file, comprising:
a server including a memory and a processor; and
one or more modules stored in the memory and executed by the processor to receive, by a YAML editor module executing on a first server, a plurality of schemas from a plurality microservices, at least one of the plurality of schemas having a first format, merge multiple schemas derived from the received schemas into a single stitched schema, receiving input, from a user through a YAML user interface, to modify a YAML file, the YAML user interface providing and allowing a user to edit the YAML file through both of a YAML code editor and a visual interface based on graphical icons, the graphical icons graphically representing pipelines, pipeline phases, and steps within a pipeline phase, retrieve, by the YAML editor module, custom field values associated with the received input, the custom field values retrieved at least in part from the single stitched schema, provide the custom field values in the UI to the user, insert one of the custom field values into the YAML file within the UI based on a user selection of the custom field values.

20. The system of claim 19, wherein the YAML user interface includes a first interface for modifying the YAML configuration file in code form and a second interface for modifying the YAML configuration file through a graphical interface that includes the graphical icons.

* * * * *